United States Patent [19]

Newman et al.

[11] Patent Number: 4,874,521

[45] Date of Patent: Oct. 17, 1989

[54] PULP MILL EFFLUENT COLOR REMOVAL PROCESS

[75] Inventors: Harold L. Newman; William S. Adams, Jr., both of DeRidder; Brace Boyden, Ruston, all of La.

[73] Assignee: Boise Cascade Corporation, Boise, Id.

[21] Appl. No.: 259,203

[22] Filed: Oct. 18, 1988

[51] Int. Cl.$^4$ .............................................. C02F 1/52
[52] U.S. Cl. .................................. 210/639; 210/704; 210/737; 210/917; 210/919; 210/928; 162/29
[58] Field of Search ................................ 210/716–718, 210/737, 766, 917, 919, 928, 638, 639, 703–705; 162/30.11, 33, 29

[56] References Cited

U.S. PATENT DOCUMENTS

| | | | |
|---|---|---|---|
| 3,652,407 | 3/1972 | Paleous | 210/928 X |
| 4,000,033 | 12/1976 | Nicolle et al. | 162/29 |
| 4,155,845 | 5/1979 | Ancelle et al. | 210/928 X |
| 4,226,673 | 10/1980 | Fremont | 162/29 |
| 4,420,369 | 12/1983 | Eaton et al. | 162/29 |
| 4,724,045 | 2/1988 | Ackel | 162/29 |
| 4,738,750 | 4/1988 | Ackel | 162/29 |

Primary Examiner—Tom Wyse
Attorney, Agent, or Firm—Laubscher, Presta & Laubscher

[57] ABSTRACT

A method for removing color from the caustic effluent produced during kraft pulping and bleaching is characterized by heating the caustic effluent to a temperature and under a pressure sufficient to cause an alteration in the chemical structure of the lignin chromophores in the effluent. The cooked effluent is cooled and has its pressure reduced to near atmospheric pressure. An acid material, such as chlorine extract from the bleaching process, is added to the effluent to lower the pH of the effluent to between 2.6 and 3.8 to initiate flocculation of the altered chromophores of the effluent. During flocculation, the chromophores are continuously separated from the effluent in order to produce a relatively clean and color-free liquid which may be deposited in the sewer system of the pulp mill.

14 Claims, 5 Drawing Sheets

PULP MILL EFFLUENT COLOR REMOVAL PROCESS

BACKGROUND OF THE INVENTION

The present invention relates to a method for removing color from the effluent of a kraft pulp mill used to manufacture paper.

In the kraft pulping process, wood is cooked in a highly alkaline solution of sodium hydroxide and sodium sulfide. The cooking separates the cellulosic fibers contained in the wood from most of the lignin that binds the fibers together. The cellulosic fibers are separated from the cooking solution and then washed. The spent cooking solution, which is referred to as black liquor, is sent to a recovery device where the organic material in the solution is combusted and the inorganic chemicals are recovered for reuse.

The washed fibers, called brownstock pulp, have a light brown color from the lignin still bound to the fibers. If whiter pulp is desired for the paper product, the fiber must be bleached. Bleaching typically uses chlorine for the first stage of the bleaching reaction.

Chlorine is selective and reacts much faster with the lignin than the cellulose fibers. After chlorine bleaching, the fibers are separated from the spent chlorination process solution. The spent chlorination stage solution is strongly acidic with a pH of 1 to 2. This spent chlorination stage solution is also called chlorination stage filtrate, C stage filtrate, chlorination extract, or acid filtrate.

The chlorinated lignin compounds are no longer bound to the pulp, but they are not very soluble in water. Also, the lignins are somewhat sticky, so the lignins mostly stay with the pulp during the first filter stage. The second bleaching stage typically consists of adding a caustic solution (sodium hydroxide) to the pulp. This raises the pH and solubilizes the chlorinated lignin compounds. Because the lignin is now soluble, the chlorinated lignin can be extracted. The second stage is thus commonly called the extraction stage.

After the bleaching reaction is complete, the pulp is separated from the spent caustic solution. The spent caustic solution is weakly alkaline with a pH of 10 to 12. This spent caustic solution is also called caustic extract, E stage filtrate, or extraction stage filtrate. This filtrate is very highly colored because of chlorinated hydrocarbons (chromophores). In a modern paper mill, the caustic extract is up to 95% of the total color in the mill effluent, but only 5% of the total sewered flow.

For environmental reasons, it is desirable to remove the color from the mill effluent. This will improve the aesthetic appearance of the effluent discharged into a stream.

BRIEF DESCRIPTION OF THE PRIOR ART

Various processes for removing color from kraft process bleach effluents are known in the art as shown, for example, in the Nicolle et al U.S. Pat. No. 4,000,033. In the process disclosed in the Nicolle et al patent, caustic effluent having a pH between 9 and 12 is combined with an acidic solution having a pH less than 1.5 to form a combined effluent having a pH below 2.8, whereby a precipitate is formed which removes color bodies from the effluent. The acid is preferably a chlorination effluent obtained by recycle of the chlorination stage washer filtrate.

While prior coagulation and acid precipitation processes are moderately successful at removing color from kraft pulp caustic effluent, these prior techniques are both expensive. High operating costs are incurred by the need for additional chemicals, and disposal of the sludge can be a problem because of its high chlorine content.

The present invention was developed in order to overcome these and other drawbacks of the prior color removal processes by providing a heat coagulation color removal process wherein caustic extract is heated to cause a chemical reaction in the aqueous lignin compounds rendering them insoluble at low pH. A portion of the extract from the chlorination stage of bleaching process is added to the caustic extract resulting in flocculation of color particles large enough to be separated from the extract.

SUMMARY OF THE INVENTION

Accordingly, it is a primary object of the present invention to provide a method for removing color from the effluent produced during kraft pulping and bleaching. In accordance with the method, the effluent comprises caustic extract having a pH of between 8 and 11 and is pressurized to between 200 and 600 psi to prevent the liquid therein from changing phase during subsequent heating of the effluent to between 150° C. and 250° C. The effluent is maintained within this temperature range for up to 20 minutes during which a chemical reaction with the effluent partially renders the lignin chromophores therein insoluble. The effluent is then cooled to between 35° and 60° C. and its pressure is reduced to between 0 to 10 psi. Chlorine extract resulting from bleaching the pulp is mixed with the effluent to lower its pH to between 2.6 and 3.8 to initiate flocculation of the chromophores in the effluent. The chormohores are then separated from the effluent for disposal.

According to a more specific object of the invention, heating and cooling of the effluent occur in a dual flow heat exchanger, whereby heat from the reaction process is recovered for increased cost efficiency.

It is another object of the invention to separate the chormophores from the effluent allowing for their disposal. More particularly, separation is accomplished via dissolved air floatation using air or other gas dissolved in the effluent following which the acid is added. Microbubbles are formed in the effluent which attach to the chromophores and carry them to the surface of the effluent. Within the dissolved air floatation device, the chromophores are skimmed from the surface of the effluent for disposal.

According to an alternate embodiment of the invention, the acid is mixed with the effluent prior to the pressure increasing and heating steps.

According to another embodiment of the invention, the acid material such as chlorine filtrate, is pressurized, heated for a period up to 20 minutes, cooled, and depressurized prior to mixing with raw caustic effluent to lower the pH of the effluent to between 2.6 and 3.8 to initiate flocculation of chromophores within the effluent. The chromophores are then separated from the remaining effluent.

BRIEF DESCRIPTION OF THE FIGURES

Other objects and advantages of the subject invention will become apparent from a study of the following specification when viewed in the light of the accompanying drawing, in which.

DETAILED DESCRIPTION

Figure 1:
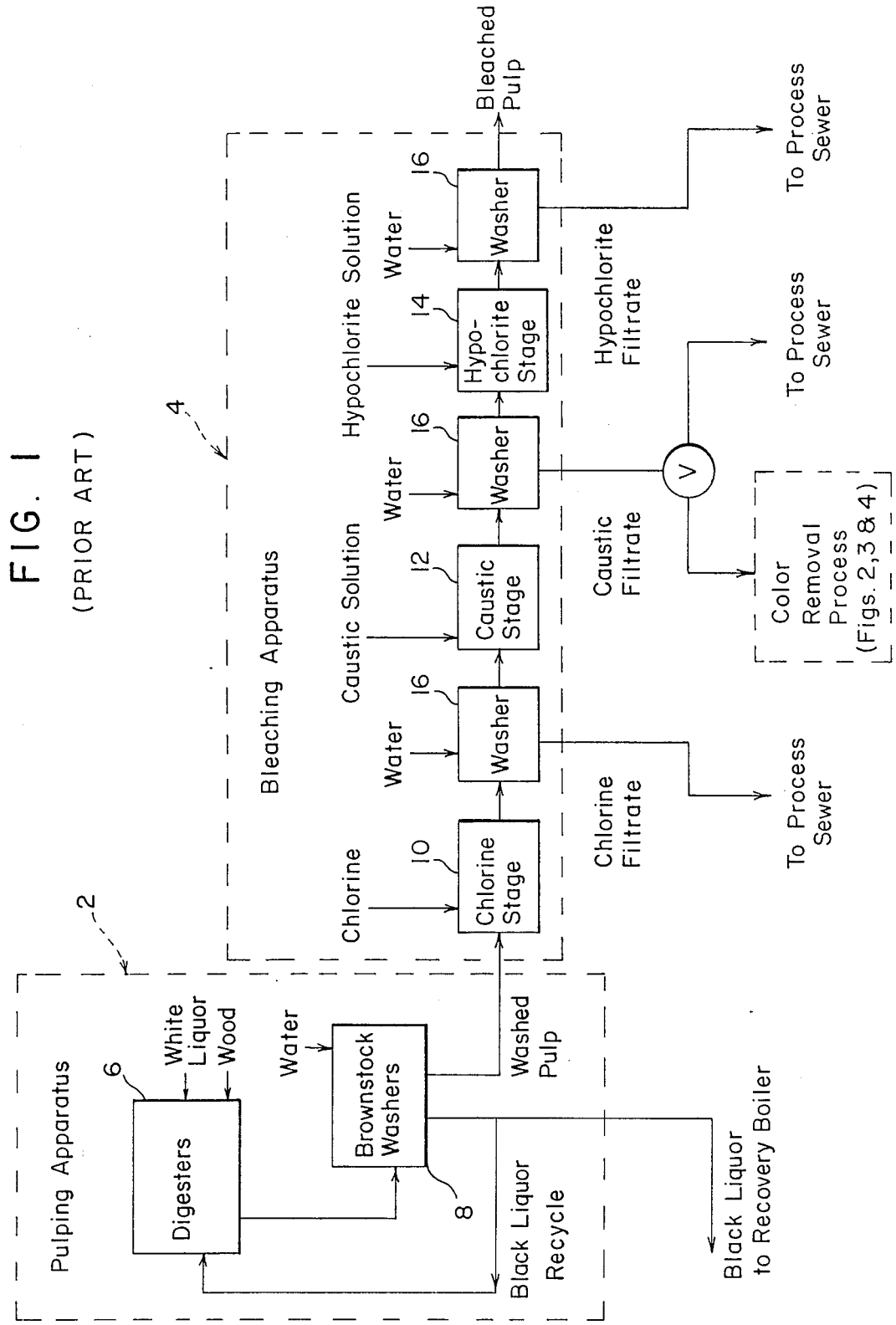
FIG. 1 is a block diagram illustrating a kraft pulping and bleaching process.

With reference to FIG. 1, the pulping apparatus 2 and the bleaching apparatus 4 of a kraft pulp mill will be described. The pulping apparatus includes at least one digester 6 within which wood chips are cooked with a white liquor alkaline solution of sodium hydroxide and sodium sulfide to separate the cellulosic fibers in the wood from the lignin that binds the fibers. The cellulosic fibers are separated from the cooking solution and washed with water in a brownstock washer 8. A portion of the spent "black liquor" cooking solution is recycled to the digester and the remainder is sent to a recovery boiler where the organic material in the solution is combusted and the inorganic chemicals are recovered.

The washed brownstock pulp comprising the cellulosic fibers has a light brown color from the lignin remaining on the fibers. Where lighter pulp is required for the end paper product, the pulp is delivered to the bleaching apparatus 4. The bleaching process typically comprises three stages: a chlorine stage 10, a caustic stage 12, and a hypochlorite stage 14. After each stage, the bleached cellulose is washed with water in a washer 16.

Chlorine is used in the first bleaching stage since it reacts much faster with the lignin than with the cellulose fibers. After chlorine bleaching, the fibers are separated from the spent chlorination process solution and washed with water. The spent chlorination stage solution which is also referred to as chlorination stage filtrate, C stage filtrate, chlorination extract, or acid filtrate is highly acidic with a pH of between 1 and 2.

Although the chlorinated lignin compounds are no longr bound to the pulp, they are somewhat sticky and not very soluble in water so they stay with the pulp during the chlorine stage. In the second or caustic stage 12, a caustic solution such as sodium hydroxide is added to the pulp to raise its pH and solubilize the chlorinated lignin compounds. Because the lignin is now soluble, the chlorinated lignin can be extracted. Thus the second stage is referred to as the extraction stage.

The third bleaching stage is the hypochlorite stage 14 wherein a hypochlorite solution is mixed with the pulp for further bleaching.

In conventional pulp mills, the filtrates from the bleaching stages are dumped in a sewer which might result in pollution of nearby streams. In accordance with the present invention, the caustic filtrate is treated to remove color therefrom.

The spent caustic solution is weakly alkaline having a pH between 10 and 12. The caustic solution, which is also referred to as caustic extract, E stage filtrate, or extraction stage filtrate, is highly colored because of the chlorinated hydrocarbons (chromophores) contained therein. In a typical paper mill, the caustic extract contains up to 95% of the total color of the mill effluent but only 5% of the total sewered flow.

Figure 2:
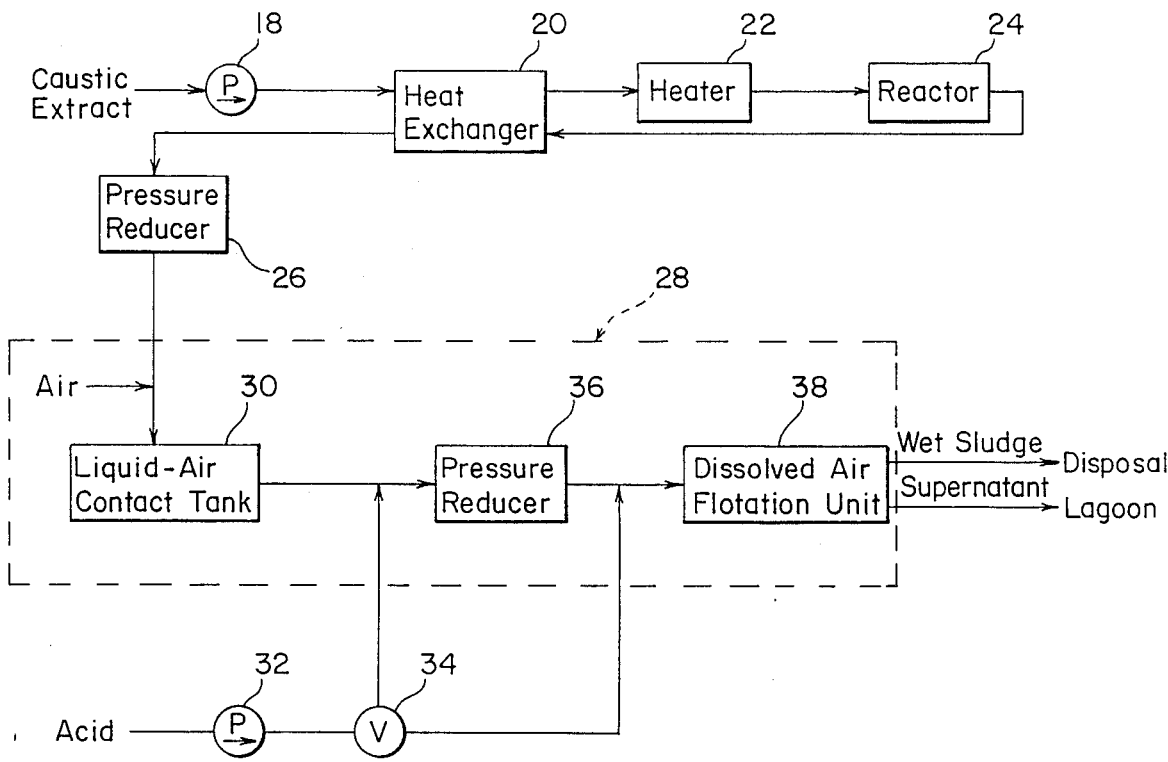
FIG. 2 is a block diagram illustrating a preferred embodiment of the process for removing color from the effluent produced during kraft pulping and bleaching according to the invention.

Referring now to FIG. 2, the preferred process for removing color from the caustic extract in accordance with the invention will be described. Although the caustic filtrate is the stream typically treated for color removal, the process according to the invention can be used to treat other streams containing lignin chromophores.

Caustic filtrate, also referred to as extract or effluent, typically emerges from the caustic washer at a rate of 1000 gallons per minute and has a pH of from 8 to 11. The effluent is delivered to a pump 18 which raises the pressure of the effluent from near atmospheric pressure to between 200 and 600 psi. The increase in pressure must be large enough to prevent the liquid in the extract from changing phase at the eventual reaction temperature. The pressurized effluent is delivered to a dual flow heat exchanger 20 which partially raises the temperature of the effluent as will be discussed below. The effluent is next delivered to a heater 22 which heats the effluent to its reaction temperature which is between 150° and 250° C. The heated effluent is then maintained in a reactor 24 for a period of time sufficient to enable a chemical change of the lignin chromophores within the effluent. The reaction time may be anywhere from instantaneous to 20 minutes in accordance with the temperature and pressure of the effluent. More particularly, effluent having a pressure of 225 psia must be heated at 200° C. with a reaction time of about 20 minutes, whereas effluent having a pressure of 576 psia must be heated to 250° C. with a reaction time of near zero since the chemical reaction is spontaneous. At temperatures below 200° C., the reaction is negligible, whereas at temperatures around 225° C., a reaction or retention time of 20 minutes is required. As will be developed below, a chemical change in the lignin chromophores which occurs in the reactor 24 makes the chromophores more susceptible to flocculation when the pH of the effluent is lowered.

At the end of the reaction time, the cooked effluent is delivered to the dual flow heat exchanger 20 where heat from the heated effluent is transferred to the incoming effluent from the pump 18. In this manner, the temperature of the incoming effluent is raised while the temperature of the cooked effluent is lowered to between 35° and 60° C. The heat recovery renders the inventive process very cost efficient.

The cooled effluent is next delivered to a pressure reducer 26 which may comprise a turbine, a control valve, or the like. The pressure of the effluent is reduced to approximately 100 psi which is a level compatible with the subsequent addition of acid to initiate flocculation as will be developed below. From the pressure reducer 26, the effluent is transferred to a floccule/liquid separation apparatus 28. This apparatus includes a liquid-air contact tank 30 wherein the effluent is mixed with air which is added or dissolved to the point of saturation within the tank 30.

In order to initiate flocculaton of the chromopohores within the effluent, it is necessary to lower the pH of the effluent. Reduction of pH is most economically accomplished through the addition of an acid material to the effluent. Preferably, the acid material comprises the chlorine extract from the first stage of the bleaching apparatus of the pulp mill shown in FIG. 1. All or at least a large portion of the flow from the chlorine washer 16, which has a flow rate of 1000 gallons per minute and a pH between 1.7 and 1.9, can be added to achieve the necessary pH reduction of the caustic effluent.

The acid material is added to the caustic effluent in one of two ways. The chlorine extract is delivered to a second pump 32 which raises its pressure to approximately 100 psi. With the valve 34 in a first position, the pressurized acid (chlorine extract) is delivered to the outlet of the liquid air contact tank 30 for mixing with the air/caustic effluent mixture. The mixture is delivered to a second pressure reducer 36 (which may also comprise a turbine, a control valve, or the like) which reduces the pressure of the mixture to between 0 and 10 psi, i.e. atmospheric pressure. The addition of the acid lowers the pH of the caustic effluent to between 2.6 and 3.8. Alternatively, the acid material may be delivered to the caustic effluent after its pressure has been reduced to near atmospheric pressure by the second pressure reducer 36. In this alternative arrangement, the valve 34 is switched to its second position and the pump 32 does not significantly pressurize the acid material. Thus, the acid is delivered to the outlet of the pressure reducer at a pressure near atmospheric pressure where it mixes with the caustic effluent thereby lowering the pH of the effluent to between 2.6 and 3.8. The mixture of acid and effluent is delivered to a dissolved air floatation unit 38. This unit is essentially a large tank equipped with a surface skimming or raking system. Reducing the pressure of the effluent to atmospheric pressure causes the formation of small bubbles or microbubbles having a diameter of between 40 and 80 micrometers. The microbubbles attach themselves to the lignin chromophore flocculant to carry it to the surface of the dissolved air floatation unit. Sludge accumulation at the top of the liquid within the unit is separated from the supernatant by the raking action of the skimming system within the unit. The sludge collects in a trough and is disposed of, and the supernatant, after passing through a baffle, exits the dissolved air floatation unit mostly free of solids.

Figure 5:
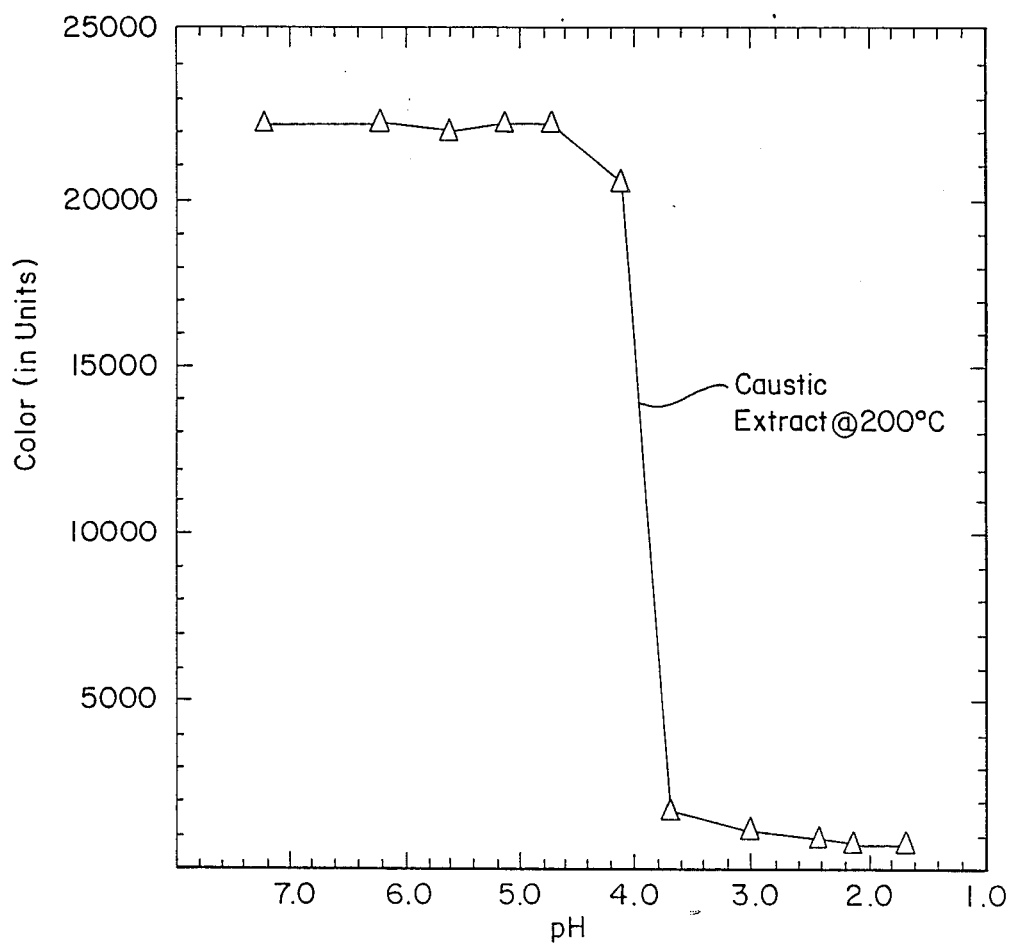
FIG. 5 is a graph illustrating the pH required to initiate precipitation of the chromophores of the effluent with chlorine extract following heating of the effluent.
Figure 6:
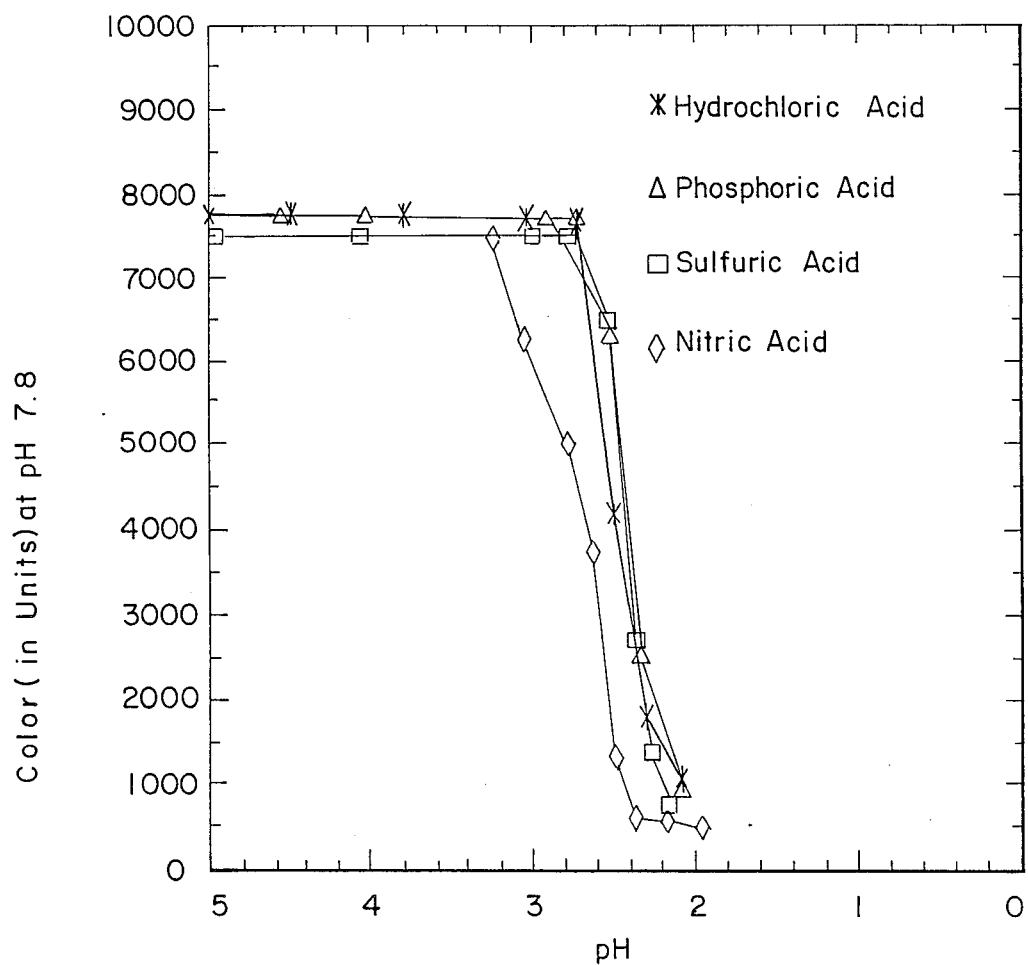
FIG. 6 is a graph illustrating the pH required to initiate precipitation of chromophores using various acids.
Figure 7:
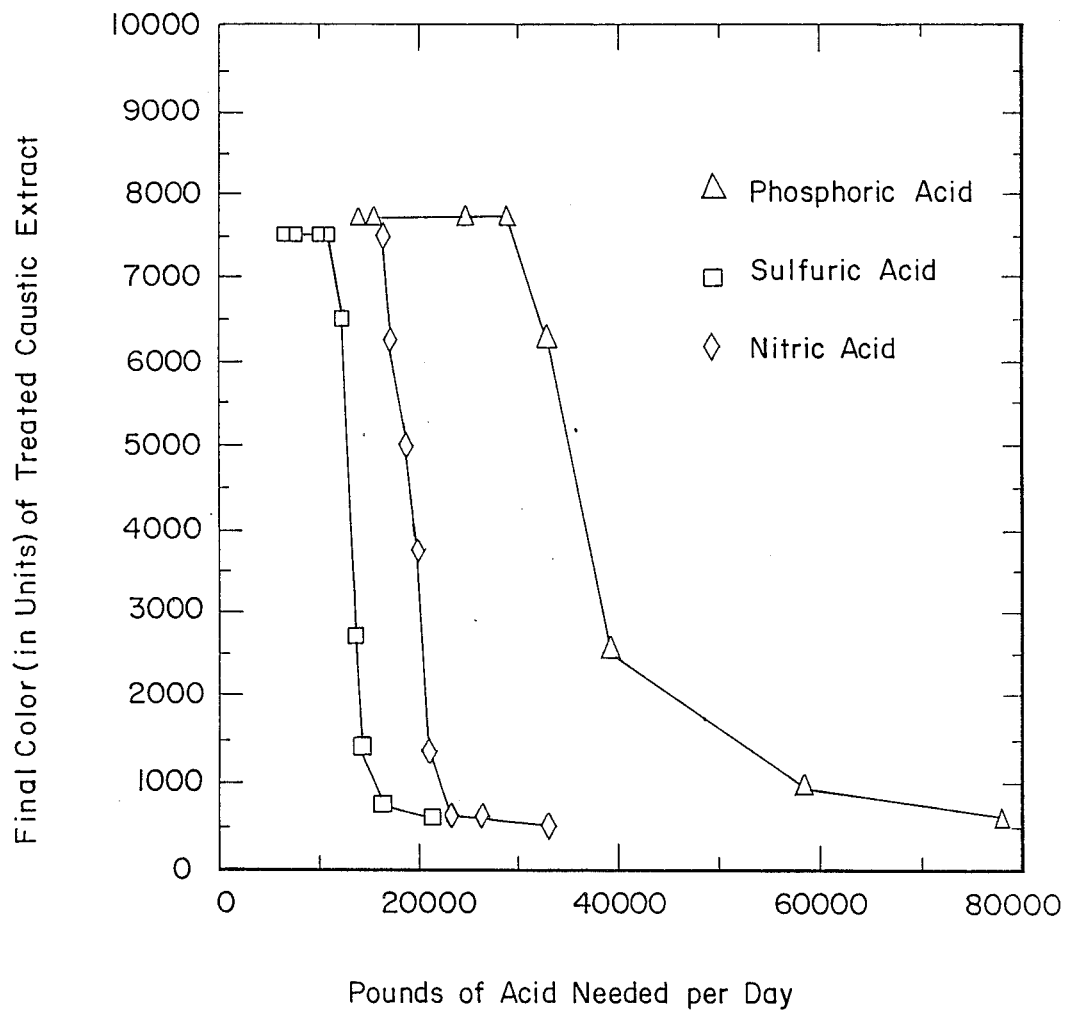
FIG. 7 is a graph illustrating the quantities of mineral acids required to treat 1000 gpm of caustic effluent.

As set forth above, the most economical acid used to lower the pH of the caustic effluent is chlorine extract from the first stage of the bleaching apparatus of FIG. 1. Referring now to the graph of FIG. 5, the pH required to initiate precipitation of the chromophores with chlorine extract after cooking of the caustic effluent to a temperature of 200° C. was approximately 3.7. Other acids may be used to initiate precipitation or flocculation of the chromophores. In FIG. 6, there are shown graphs of pH versus color for a caustic effluent treated with hydrochloric acid, phosphoric acid, sulfuric acid, and nitric acid. The required pH for these different acids were found to be around 2.6. In FIG. 7, there are shown graphs illustrating the amounts of equivalent mineral acids at standard strengths required to treat 1000 gallons per minute of caustic extract. From these graphs, it is clear that a pH range of between 2.6 and 3.8 is necessary to initiate precipitation or flocculation of the chromophores from the caustic effluent following cooking thereof. It is clear from FIG. 7 that the use of the chlorine extract from the bleaching apparatus will result in a substantial cost savings in acid material required to remove color from the caustic extract since the use of other acids is not necessary.

The retention times required during which the caustic effluent is heated and retained in the reactor 24 reflect the best approximations for the reaction to proceed to a reasonable state of completion at the cited reaction temperature. Such a state of completion is assumed to be greater than 95% removal of color from the caustic effluent. This process has proven successful for a number of different effluents. However, specific application of the inventive process will require some minor variation in accordance with the hetergeneous nature of the woods used in the pulp mill and the particular delignification processes used in the pulping apparatus.

Heating of the caustic effluent which eventually results in color removal does not proceed appreciably below 200° C. Specific color removal has a function of time at various temperatures are set forth in the following table:

TABLE 1

| Temperature (deg. Celsius) | Running Reaction Time (min.) | Color Change [+/−] (% from original) |
|---|---|---|
| 20 | start, time 0 | 0 |
| 50 | 5.5 | 0 |
| 100 | 12.0 | 0 |
| 150 | 22.0 | 0 |
| 175 | 26.0 | +16 |
| 200 | 31.0 | +16 |
| 225 | 35.0 | −54 |
| 250 | 39.5 | −77 |
| 250 | 49.5 | −86 |

Figure 3:
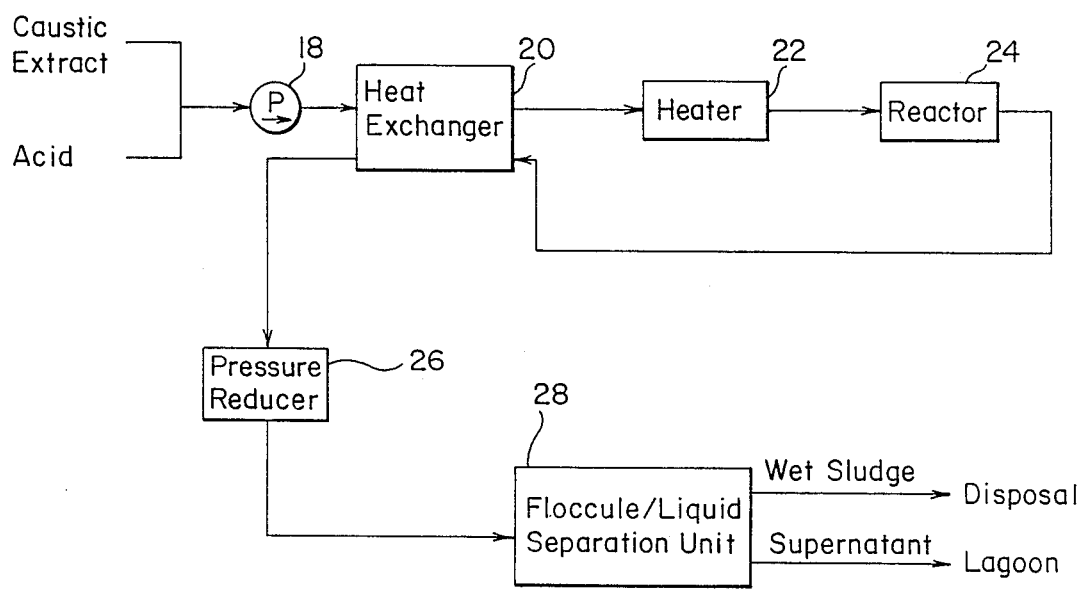
FIGS. 3 and 4 are block diagrams illustrating alternate embodiments of a process for removing color from pulp mill effluent.

In the alternate embodiment shown in FIG. 3, the only difference in the process shown therein from that shown in FIG. 2 is that the caustic extract or effluent is mixed with the acid, which preferably comprises the chlorine extract from the bleaching process, prior to introduction into the pressurizing pump 18. Thus, in the embodiment of FIG. 3, the caustic effluent and acid are cooked together within the heat exchanger 20 and the heater 22. This reaction requires lower temperatures. In fact, this particular reaction becomes active at 175° C. As set forth in Table 2 below, reaction times and temperatures using the process shown in FIG. 3 are as follows:

TABLE 2

| Temperature (deg. Celsius) | Running Reaction Time (min.) | Combined Acid & Caustic Streams, Color Change [+/−] (% from original) |
|---|---|---|
| 20 | start, time 0 | 0 |
| 50 | 5.5 | +6 |
| 100 | 12.0 | +6 |
| 150 | 22.0 | +3 |
| 175 | 26.0 | −22 |
| 225 | 35.0 | −53 |
| 250 | 39.5 | −61 |

Figure 4:
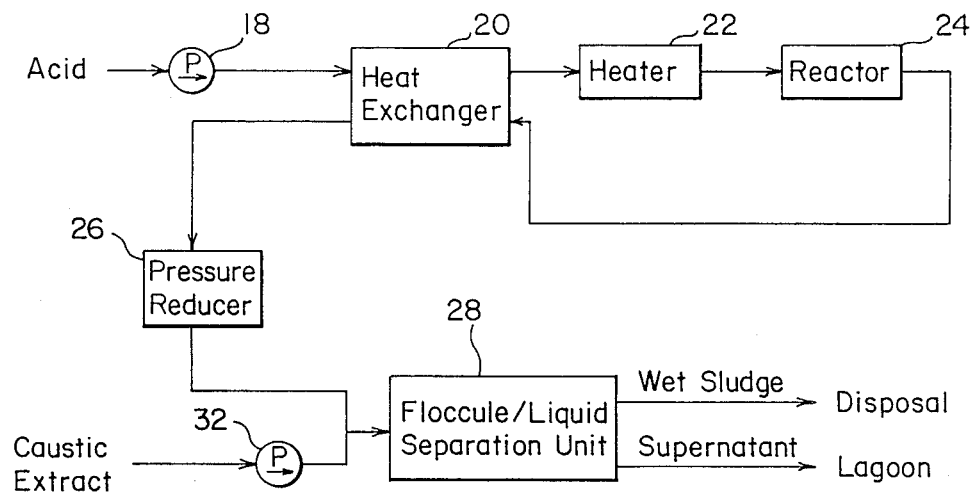

In the third embodiment shown in FIG. 4, the same parameters apply as were used in the embodiment of FIG. 2. In the process of FIG. 4, the acid extract was cooked and then mixed with uncooked caustic extract. The mixture was delivered to a floccule/liquid separation unit 28 as shown in Fig. 4. Using the process of FIG. 4, a 96% reduction of color from the acid effluent was achieved using a cooking temperature for the acid of 250° C. More particularly, the acid, which preferably comprises the chlorine extract, is delivered to a pump 18 and pressurized to a pressure of between 200 and 600 psi. The pressurized acid is delivered to the heat exchanger 20 and to a subsequent heater 22 to raise the temperature of the acid to between 175° and 250° C. The heated acid is retained in the reactor 24 for a short period of time which in this instance is less than the 20 minute time period required in the embodiment of FIG. 2, since the reaction of the acid material is spontaneous. The reacted acid is cooled in the heat exchanger 20 and its pressure is reduced by the pressure reducer 26 to approximately atomspheric pressure up to 100 psi. The caustic extract is also pressurized to match the pressure of the cooked acid prior to entry into the floccule/liquid separation unit 28. Within the unit, the mixture of the caustic extract and cooked acid extract raises the pH of the cooked acid extract resulting in flocculation or precipitation of the chromophores therein which are separated from the remaining liquid in the same manner as in the embodiment of FIG. 2.

SUMMARY

When raw caustic and acid extracts from the E and C stages, respectively, of FIG. 1 are mixed together, only a small amount of precipitation occurs. The extent of precipitation depends on the concentration of the caustic material. However, cooking the caustic material as stated in connection with the first embodiment, with a subsequent pH reduction resulting from the addition of the acid extract, results in the maximum amount of precipitation. Moreover, the floc resulting in the dissolved air floatation unit is larger and self-coagulates, thereby making separation of the chromophores much easier. The quantity or volume of C stage filtrate required to obtain maximum color removal is that necessary to lower the pH of the caustic effluent below 3.8 for precipitation to occur.

Cooling of the heated caustic material prior to lowering the pH thereof by addition of the acid is preferred since without cooling, the pressure of the acid stream would have to be raised to approximately 600 psi and also heated to the reaction temperature. Chromophoric precipitation would be unaffected, however, and the additional cost in terms of pumping and handling a low pH liquid in terms of metallurgy would be economically unfeasible. With the process according to the invention, heat is recovered through the heat exchanger, pumping costs are minimized, and the handling of a hot, low pH liquid is avoided.

With regard to cooking the C stage effluent as in the embodiment of FIGS. 3 and 4, when the C stage filtrate was heated to 250° C. for 10 minutes and the pH raised, a 96% reduction in color was measured. The C stage effluent exits the C stage washer with a color from 1500 to 2200 color units. Thus, there are lignin chromophores or other chromophore compounds which are soluble at low pH. Raising the pH without cooking the C filtrate does not induce flocculation. However, cooking the C stage filtrate results in a change in the pKa (the point at which a material is soluble). Elevating the pH to 7.8 which is the colored testing point results in nearly complete flocculation of solution color. It should be noted that when C filtrate is used for pH control on the cooked caustic effluent, the supernatant (separated from the sludge) is still colored, and to a large extent, this color results from the C filtrate.

Cooking the E filtrate does seem to decrease the average organic chlorine content of the chromophores. An explanation of this phenomenon is the presence of condensation reactions at these high reaction temperatures. In this reaction scenario, the organically bound chlorine is condensed as HCl (which is preferentially soluble in the aqueous phase). This reaction could be catalyzed not only at a high pH as with the cooked caustic extract, but also at low pH such as with cooking the chlorine extract. It is therefore conceivable that the chlorine content of the soluble chromophores could also be reduced by cooking. Post-reaction pH adjustment of cooked C filtrate does not intrinsically effect the pKa of the resident lignins, whereas, cooking of the C filtrate does. The pH adjustment takes advantage of this reaction phenomenon to flocculate out the soluble liquid compounds.

In lieu of the dissolved air floatation unit, any other type of separation process may be used to separate the chromophores from the liquid of the caustic of the effluent. These alternative separation processes includes filtration, reverse osmosis, and the like.

The inventive color removable process is not an oxidation or coking process because no air or oxygen is added to the reactor and because no large particles are formed until the acid is added. Moreover, the new processes are reversible. The decolorization reaction according to the present invention can be adjusted for the effluent discharge situation of various pulping mills. Mills with large streams or rivers receiving treated effluent may not need a large amount of color removal. Mills needing less color removal can use lower temperatures and/or shorter reaction times. Other mills, however, discharge into small streams or have tight color restrictions and thus require longer reaction times and/or reaction temperatures to increase color removal.

As set forth above, cooking the caustic extract at 250° C. causes chemical changes in the aqueous lignant compounds rendering them insoluble at low pH. The pH of the cooked caustic extract may be reduced with acid extract from the bleach plant or any other strong mineral acid. The flocculated cooked lignin is, however, quite different from uncooked acid precipitated lignin. The cooking process decreases the chlorine content of the lignin to about 0.2% of the original content. The cooked lignin is easy to handle since it is not sticky. A cooked liquid flocculant is mostly water, i.e. about 98% water, compared to 30–70% water for the acid precipitant. The exact reaction occuring during heating of the caustic effluent is not known. What is known, however, is that some chemical degradation reaction occurs because the reaction does not yield an organic solid that is insoluble in water. The empirical formula for the unreacted chromophore in the caustic extract is as follows:

$$C_1 H_{0.8808} O_{0.8757} Cl_{0.1861}$$

The chloride content of the empirical formula is 19.7% or 197,000 parts per million. The chromophores have a molecular weight that varies from 55% being less than 6000 to 28% with a molecular weight greater than 25,000.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. A method for removing color from the caustic effluent produced during kraft pulping and bleaching, comprising the steps of (a) increasing the pressure of the effluent to between 200 and 600 psi to prevent the liquid within the effluent from changing phase;
(b) heating the effluent to a temperature between 200° and 250° C. for a retention time up to 20 minutes in accordance with said temperature to alter the chemical structure of lignin chromophores in the effluent;
(c) cooling the effluent to a temperature between 35° and 60° C.;
(d) reducing the pressure of the effluent to between 0 to 10 psi;
(e) lowering the pH of the effluent to between 2.6 and 3.8 to initiate flocculation of said altered chromophores in the effluent; and
(f) separating said chromophores from the effluent.

2. A method as defined in claim 1, wherein the pH of the effluent is lowered by adding acid thereto.

3. A method as defined in claim 2, wherein said acid comprises at least one of hydrochloric acid, phosphoric acid, sulfuric acid, and nitric acid.

4. A method as defined in claim 3, wherein following cooling of the effluent, the pressure thereof is reduced to between 75 and 125 psi, and further comprising the step of increasing the pressure of said acid to between 75 and 125 psi prior to adding said acid to the effluent.

5. A method as defined in claim 4, wherein said heating and cooling steps are performed by a dual flow heat exchanger.

6. A method as defined in claim 5, and further comprising the step of adding air to the effluent prior to the addition of acid, whereby upon addition of said acid, microbubbles are formed in the effluent which attach to said chromophores to carry said chromophores to the surface of the effluent.

7. A method as defined in claim 6, wherein said separation step is performed in a dissolved air floatation unit which skims the surface of the effluent to remove the chromophores therefrom.

8. A method as defined in claim 5, wherein said separation step comprises filtration.

9. A method as defined in claim 5, wherein said separation step comprises reverse osmosis.

10. A method as defined in claim 2, wherein said acid comprises chlorine extract resulting from bleaching the pulp.

11. A method as defined in claim 3, wherein said acid is added to the effluent prior to said pressure increasing and heating steps.

12. A method for removing color from the effluent produced during kraft pulping and bleaching, comprising the steps of
(a) increasing the pressure of an acid material to between 200 and 600 psi;
(b) heating said acid material to a temperature between 200° and 250° C. for a period of time up to 20 minutes in accordance with said temperature;
(c) cooling said acid material to a temperature between 35° and 60° C.;
(d) reducing the pressure of said acid material to between 0 and 10 psi;
(e) mixing said acid material with the effluent to lower the pH of the effluent to between 2.6 and 3.8 to initiate flocculation of chromophores in the effluent; and
(f) separating said chromophores from the effluent.

13. A method as defined in claim 12, wherein said acid material comprises at least one of hydrochloric acid, phosphoric acid, sulfuric acid, and nitric acid.

14. A method as defined in claim 13, wherein said acid material comprises chlorine extract resulting from bleaching the pulp.

* * * * *